3,573,986
HEAT ACTIVATED CELL
Jacob Greenberg, Pepper Pike, Ohio, assignor to the United States of America as represented by the Administrator of the National Aeronautics and Space Administration
Filed Dec. 30, 1968, Ser. No. 787,911
Int. Cl. H01m 21/00, 17/06
U.S. Cl. 136—83             11 Claims

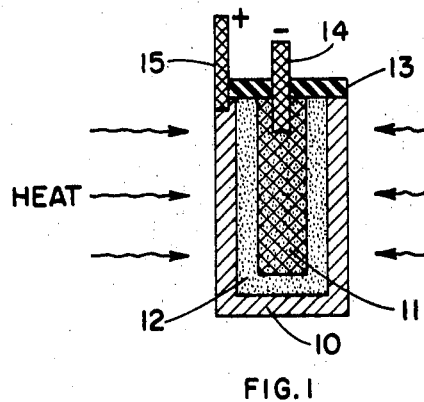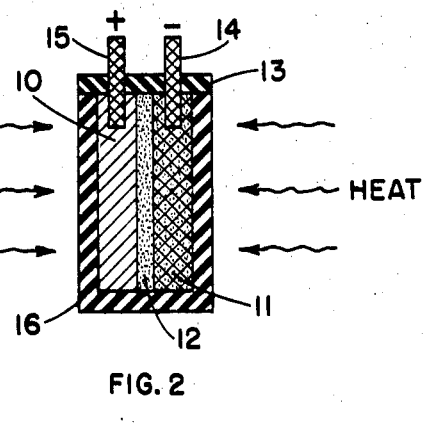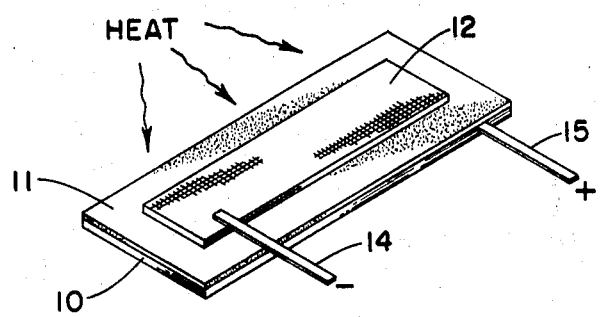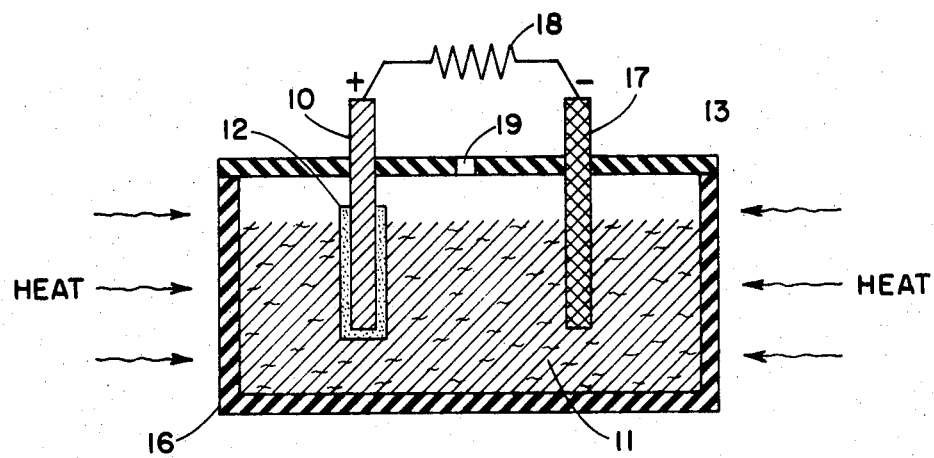
INVENTOR
JACOB GREENBERG

# United States Patent Office 3,573,986
Patented Apr. 6, 1971

ABSTRACT OF THE DISCLOSURE

A heat activated electromotive force (EMF) cell having an anode formed of aluminum and a cathode comprising an oxidizing material such as sulfur. The cathode material is supported in a container or in a matrix such as porous carbon. An aluminum salt layer electrolyte such as AlCl separates the anode from the cathode. To minimize vaporization of the aluminum salt, an alkali halide salt may be mixed therewith. The cell may be operated at temperatures up to a point where either the cathode material or the electrolyte is molten.

ORIGIN OF THE INVENTION

This invention described herein was made by an employee of the United States Government and may be manufactured and used by or for the Government of the United States of America for governmental purposes without the payment of any royalties thereon or therefor.

BACKGROUND OF THE INVENTION

This invention relates to heat activated EMF cells and is directed more particularly to a heat activated EMF cell having an aluminum anode.

Because of its low equivalent weight, relatively high energy density, ease of handling, and availability in many inexpensive forms, aluminum is a very desirable material for use as battery anodes. In the past, some EMF cells have been constructed using aluminum anodes with aqueous electrolytes. Such EMF cells have not been successful because of corrosion which occurs of the aluminum anode. This corrosion causes unacceptably low efficiency in aluminum anode cells.

Accordingly, it is an object of the invention to provide an improved aluminum anode cell.

It is another object of the invention to provide an aluminum anode cell having high efficiency.

Still another object of the invention is to provide an aluminum anode cell having a relatively thin electrolyte of large area.

A further object of the invention is to provide a heat activated, aluminum anode cell which may be operated at temperatures at which the electrolyte may be either solid or molten.

An additional object of the invention is to provide an EMF cell having an aluminum anode which does not corrode.

It is yet another object of the invention to provide a cell of the above type in which the cathode may be either solid or molten.

In summary, the invention provides a heat activated cell using an aluminum anode. The cell operates at high efficiency by using a thin, heated electrolyte comprising at least one aluminum salt. Depending on the materials used for the cathode and the electrolyte, the cell may be operated with either the electrolyte or the cathode in a molten state.

BRIEF DESCRIPTION OF THE DRAWINGS

FIG. 1 is a cross-sectional view of one configuration of a cell embodying the invention;

FIG. 2 is a cross-sectional view of a cell in which the anode, cathode, and electrolyte are in the form of side-by-side plates;

FIG. 3 is a pictorial drawing of a rollable cell embodying the invention; and

FIG. 4 is a cross-sectional view of still another form of cell embodying the invention.

DESCRIPTION OF A PREFERRED EMBODIMENT

Referring now to FIG. 1, it will be seen that a cell constructed in accordance with the invention may include an aluminum container 10 which serves as the anode of the cell. A post 11 formed of porous carbon saturated with sulfur is disposed in the container 10 to serve as a cathode. The sulfur must be substantially completely and evenly distributed in the porous carbon of the post 11 in order for the post to function properly as a cathode. The porous carbon thus serves as a matrix or holder-support for the sulfur cathode material. Because methods of saturating porous carbon with sulfur are well known to those skilled in the art, such methods will not be described herein.

If desired, the cathode post 11 may be formed of any metal which: may be made in porous form; is lower in the electromotive series than aluminum; and does not react chemically with the sulfur or any other suitable cathode materials used to saturate the cathode post 11. Other suitable materials which may replace the sulfur in the post 11 include any $O_2$ or Cl producing materials, as for example, halogen compounds or organic compounds containing oxygen. In general, the cathode may be any suitable oxidizing material which will react with aluminum to form an aluminum salt.

To the end that the cell shown in FIG. 1 will produce a relatively high current density at high efficiency, a thin electrolyte 12 is disposed between the cathode post 11 and the aluminum container 10 and is heated by heat applied to the cell. An electrolyte thickness of one-eighth inch is sufficiently thin for the structure shown in FIG. 1. In accordance with the invention, the electrolyte 12 comprises at least one aluminum salt. At least one alkali halide salt may be added to the aluminum salt to minimize vaporation of the aluminum salt. Because it is generally desirable to operate a heat activated cell at the lowest possible temperature, and because of considerations of economy, availability, and ease of handling, a eutectic mixture of AlCl-NaCl has been found to be the most suitable electrolyte. With this particular electrolyte mixture or with any aluminum halide salt-alkali salt mixture, the cell is normally operated in a temperature range of from about 50° C. to about 100° C. by externally applied heat. However, the cell may be operated up to temperatures greater than the melting point of the electrolyte mixture if desired. The uppermost practical limit is about 600° C., which is well below the melting point of the aluminum anode.

The cell of FIG. 1 is completed by a cover plate 13 and electrodes 14 and 15. The cover plate 13 is an electrical insulating material such as ceramic. The electrodes 14 may be either carbon or any suitable metal compatible with the materials used in the cathode post 11, the anode 10, and the electrolyte 12.

FIG. 2 illustrates an alternate arrangement of the cell shown in FIG. 1 and like parts are identified by like numerals. In FIG. 2, the anode 10, the cathode 11, and the electrolyte 12 are in the form of side-by-side plates. The electrolyte 12 is positioned between the anode 10 and the cathode 11. A suitable container 16 made of electrically nonconductive material is disposed around the anode 10, the cathode 11, and the electrolyte 12 to hold them in place.

FIG. 3 pictorially shows another possible arrangement of a cell constructed in accordance with the invention. Parts in FIG. 3 are identified by numerals corresponding to like parts in FIGS. 1 and 2. In the cell of FIG. 3, the anode 10 is a sheet of aluminum foil. The aluminum salt-alkali halide electrolyte 12 is coated onto the aluminum foil as a thin layer. This layer is preferably less than one millimeter thick. The cathode 11 comprises a sulfur saturated graphite cloth placed against the electrolyte 12. Suitable metal electrodes 14 and 15 of carbon or metal are attached to the cathode 11 and the anode 10, respectively. The cell shown in FIG. 3 advantageously may be either folded or rolled and placed in a hermetically sealed container such as a foil pouch.

A cell constructed as shown in FIG. 3 and having an AlCl-NaCl electrolyte will deliver about 10 milliamperes per square centimeter (ma./cm.$^2$) of electrolyte area when operated at a temperature slightly below 150° C., the melting point of the electrolyte. The cell delivers about 25 ma./cm.$^2$ when it operates at about 200° C. The EMF in both cases is approximately 1.2 volts.

FIG. 4 shows still another form of cell embodying the invention. Parts corresponding to those in FIGS. 1, 2, and 3 are identified by like numerals. The cell of FIG. 4 includes an anode 10 in the form of an aluminum rod which extends into a container 16 through a cover plate 13 made of an electrically insulating material. The cathode 11 is a molten mixture comprising sodium sulfide, sulfur, and water. An electrode 17 of electrically conductive material extends through the cover plate 13 into the anode 11. The electrode 17 may be carbon or a metal which will not react with any of the other materials in the cell.

A current path such as a load in the form of a resistor 18 may be connected between the anode 10 and the electrode 17 to produce a heating effect in the cell. This heating helps sustain operation of the cell. A thin electrolyte 12 of aluminum sulfide is formed on the aluminum anode 10. The electrolyte also serves as a separator by preventing the cathode 11 material from contacting the anode 10. To allow hydrogen sulfide gas to escape as it accumulates around the electrode 17 during operation of the cell, a vent 19 is provided in the cover plate 13.

The cell shown in FIG. 4 is a primary cell and is not rechargeable. The cell is put into operation in the following manner. Commercial quality sodium sulfide is placed in the container 16. Heat is then applied to the container 16 causing the sodium sulfide to melt into its own water of hydration. This takes place when the sodium sulfide is heated to 50° C. or above. When the sodium sulfide is molten, it comprises sodium sulfide, sulfur, and water. The aluminum anode 10 and the carbon electrode 17 are then inserted into the molten sodium sulfide, sulfur, and water mixture which form the cathode 11. A protective coating of aluminum sulfide immediately forms on the aluminum anode 10. This coating serves as both a separator and an electrolyte.

As current flows between the anode 10 and the electrode 17 through the load 18, electrochemical action between the anode 10 and the cathode 11 progresses. Aluminum ions build up on the anode 10 while sulfide ions build up on the carbon electrode 17. The sulfide ions accumulating on the electrode 17 tend to reduce or at least limit the current capability or energy density of the cell. However, the sulfide ions will react with the water in the molten cathode to form $H_2S$. Accordingly, the cell may be made to provide a relatively high current output by removing the $H_2S$ gas which forms at the electrode 17. To this end, the $H_2S$ is allowed to escape through a vent 19 provided in the cover plate 13.

By making the load 18 a relatively low resistance, a relatively high current will be transferred between the anode 10 and the electrode 17. This accelerates the electrochemical action taking place between the anode 10, the cathode 11, and the electrolyte 12 and produces heating. Thus, by selecting a load 18 of sufficiently low resistance, enough heat may be generated in the cell to make its operation self-sustaining. Consequently, it will be seen that, with a properly selected load 18, the exterior heat applied to the cell to initiate operation may now be removed. Of course, it will be understood by those skilled in the art that the selection of the load 18 will be affected by other considerations such as the size of the container 16 and the amount of cathode material 11, as well as the size of the anode 10 and the electrode 17.

It will be understood that those skilled in the art may make changes and modifications to the foregoing heat activated cell without departing from the spirit and scope of the invention as set forth in the claims appended hereto.

What is claimed is:

1. An EMF cell operated by heat from a heat source and comprising:
   a solid aluminum anode;
   a cathode comprising at least one solid oxidizing material which will react with the aluminum anode to form an aluminum salt;
   solid electrolyte disposed between said anode and said cathode and in contact with each, said electrolyte consisting essentially of at least one aluminum salt; and
   means for supporting said cathode material in a desired configuration.

2. The cell set forth in claim 1 wherein said means for supporting said cathode material is a porous electrical conducting material.

3. The cell set forth in claim 1 wherein said cathode is a halogen compound.

4. The cell set forth in claim 1 wherein said heat source maintains the cell at a temperature of from about 50° C. to about 100° C.

5. The cell set forth in claim 1 wherein said electrolyte is less than about one-eighth inch thick.

6. The cell set forth in claim 1 wherein said means for supporting said cathode is a container; said cathode is a mixture comprising sodium sulfide, sulfur, and water; and said electrolyte is aluminum sulfide.

7. The cell set forth in claim 6 and including an electrode contacting said cathode and further including a load of predetermined value connected between said anode and said electrode to produce a self-sustaining heating effect.

8. An EMF cell operated by heat from a heat source and comprising:
   a solid aluminum anode;
   a cathode comprising at least one solid oxidizing material which will react with the aluminum anode to form an aluminum salt;
   solid electrolyte disposed between said anode and said cathode and in contact with each, said electrolyte consists essentially of a eutectic mixture of at least one aluminum halide salt and at least one alkali halide salt; and means for supporting said cathode material in a desired configuration.

9. The cell of claim 8 wherein:
said anode comprises a sheet of aluminum foil;
said electrolyte is a layer coated on to one side of said anode and at least one alkali halide salt; and
said cathode comprises a graphite cloth saturated with sulfur and placed against said electrolyte.

10. The cell set forth in claim 8 wherein said electrolyte is a eutectic mixture of AlCl and NaCl.

11. The cell set forth in claim 8 wherein said electrolyte layer is less than about one millimeter thick.

References Cited

UNITED STATES PATENTS

| | | | |
|---|---|---|---|
| 2,638,489 | 5/1953 | Ruben | 136—83 |
| 2,718,539 | 9/1955 | Bradshaw et al. | 136—83 |
| 2,759,986 | 8/1956 | Morehouse et al. | 136—100 |
| 2,954,417 | 9/1960 | Lehovec et al. | 136—13 |
| 3,117,032 | 1/1964 | Panzer | 136—100 |
| 3,121,028 | 2/1964 | Story | 136—6 |
| 3,192,071 | 6/1965 | Vinal | 136—121 |
| 3,248,265 | 4/1966 | Herbert | 136—6 |
| 3,352,715 | 11/1967 | Zaromb | 136—83 |
| 3,423,242 | 1/1969 | Meyers et al. | 136—6 |
| 3,463,670 | 8/1969 | Rao et al. | 136—83 |

FOREIGN PATENTS

| | | | |
|---|---|---|---|
| 683,182 | 3/1964 | Canada | 136—83 |

ALLEN B. CURTIS, Primary Examiner

A. SKAPARS, Assistant Examiner

U.S. Cl. X.R.

136—90, 100, 153